US010878072B2

United States Patent
Fong et al.

(10) Patent No.: US 10,878,072 B2
(45) Date of Patent: Dec. 29, 2020

(54) SYSTEMS AND METHODS FOR BIOMETRIC IDENTITY AND AUTHENTICATION

(71) Applicant: PPIP LLC, Tempe, AZ (US)

(72) Inventors: Michael Fong, Chandler, AZ (US); Neric Hsin-wu Fong, Tempe, AZ (US); Stephen Kuo-Tung Seay Chan, Annapolis, MD (US); Krishna Teja Tokola, Tempe, AZ (US); Huyen Nguyen Ngoc Cam Le, Tempe, AZ (US)

(73) Assignee: PPIP, LLC, Tempe, AZ (US)

( * ) Notice: Subject to any disclaimer, the term of this patent is extended or adjusted under 35 U.S.C. 154(b) by 103 days.

(21) Appl. No.: 16/194,809

(22) Filed: Nov. 19, 2018

(65) Prior Publication Data

US 2019/0354787 A1    Nov. 21, 2019

Related U.S. Application Data

(60) Provisional application No. 62/588,890, filed on Nov. 20, 2017.

(51) Int. Cl.
*G06K 9/00* (2006.01)
*G06F 21/32* (2013.01)
(Continued)

(52) U.S. Cl.
CPC ......... *G06F 21/32* (2013.01); *G06K 9/00577* (2013.01); *G06K 9/00892* (2013.01);
(Continued)

(58) Field of Classification Search
CPC ..... G06F 21/32; H04L 63/0861; G06N 20/00; G06N 3/08; G06K 9/00087;
(Continued)

(56) References Cited

U.S. PATENT DOCUMENTS

| 10,075,846 B1* | 9/2018 | Acar | H04L 63/0861 |
| 2014/0188770 A1* | 7/2014 | Agrafioti | G06K 9/00885 |
| | | | 706/13 |

(Continued)

OTHER PUBLICATIONS

Shihui Yin et al., "Designing ECG-Based Physical Unclonable Function for Security of Wearable Devices", 39th Annual International Conference of the IEEE Engineering in Medicine and Biology Society, Feb. 21, 2017, pp. 1-4.

*Primary Examiner* — Li Liu
(74) *Attorney, Agent, or Firm* — Fernando & Partners, LLP

(57) ABSTRACT

In accordance with some embodiments, a training method for biometric identity and authentication is provided. The method includes obtaining biometric data from a plurality of sources. The method further includes extracting a plurality of feature vectors from the biometric data. The method also includes determining a plurality of identifiability scores correspondingly associated with the plurality of feature vectors, where each of the plurality of identifiability scores provides a quantitative characterization of a relative uniqueness of a corresponding one of the plurality of feature vectors. The method additional includes determining run-time authentication neural network parameters based on a function of the plurality of feature vectors, where the run-time authentication neural network parameters enable extraction of one or more feature vectors from biometric data of a particular user, and the run-time authentication neural network parameters are associated with the plurality of feature vectors determined to satisfy an error threshold.

20 Claims, 10 Drawing Sheets

(51) Int. Cl.
  *G06N 3/08*     (2006.01)
  *G06K 9/46*     (2006.01)
  *G06K 9/62*     (2006.01)
  *H04L 29/06*    (2006.01)
  *G06N 20/00*    (2019.01)
  *H04W 12/06*    (2009.01)

(52) U.S. Cl.
  CPC ............ *G06K 9/46* (2013.01); *G06K 9/6262* (2013.01); *G06N 3/08* (2013.01); *H04L 63/0861* (2013.01); *G06K 9/00087* (2013.01); *G06K 9/00979* (2013.01); *G06N 20/00* (2019.01); *H04W 12/06* (2013.01)

(58) Field of Classification Search
  CPC .. G06K 9/00577; G06K 9/00892; G06K 9/46; G06K 2009/00939; G06K 9/00885; G06K 9/00288; H04W 12/06; A61B 5/7267; A61B 5/6802
  See application file for complete search history.

(56) References Cited

U.S. PATENT DOCUMENTS

| | | | |
|---|---|---|---|
| 2016/0352727 A1* | 12/2016 | Day | A61B 5/7221 |
| 2017/0035327 A1* | 2/2017 | Yuen | A61B 5/7264 |
| 2018/0012092 A1* | 1/2018 | Gleeson-May | G06K 9/00281 |
| 2018/0106897 A1* | 4/2018 | Shouldice | G01S 13/56 |
| 2018/0232508 A1* | 8/2018 | Kursun | G06N 3/0454 |
| 2019/0121682 A1* | 4/2019 | Adiletta | G06F 9/452 |

\* cited by examiner

… (1)

SYSTEMS AND METHODS FOR BIOMETRIC IDENTITY AND AUTHENTICATION

PRIORITY CLAIM

This application claims priority to U.S. provisional patent application No. 62/588,890 filed on Nov. 20, 2017, the contents of which are hereby incorporated by reference.

TECHNICAL FIELD

This relates generally to the field of biometric identification, and more specifically to biometric identity extraction for authentication.

BACKGROUND

An exponential growth of smart devices gives rise to security and privacy concerns. It is necessary to authenticate a user's identity in order to prevent appropriation of private information from the smart devices. In recent years, authentication mechanisms using biometric data have shown the potential of providing enhanced authentication over traditional password ("what you know") and token ("what you have") authentication approaches.

Biometric characteristics have many desirable traits, such as unique to each individual ("what you are"), non-transferable to others, impossible to forget or lose, difficult to reproduce, and difficult to change or hide. Thus, many have developed biometric identity and authentication (IDA) systems that use biometric data for authentication. However, many existing biometric IDA systems focus on point-of-entry authentication (e.g., fingerprint, iris scan, etc.). The point-of-entry authentication technique has a number of weaknesses. For example, once the user identity, including a forged identity (e.g., by providing a fingerprint image), has been verified at login, the user often gains unfettered access to the smart device. To increase the level of authentication beyond the standard point-of-entry authentication technique, some have proposed continuous biometric authentication. To this end, research suggests that no single biometric approach is ideally suited to all scenarios, e.g., the ability to be compromised, ease of use, obtrusiveness, and/or the embodiment complexity, etc.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
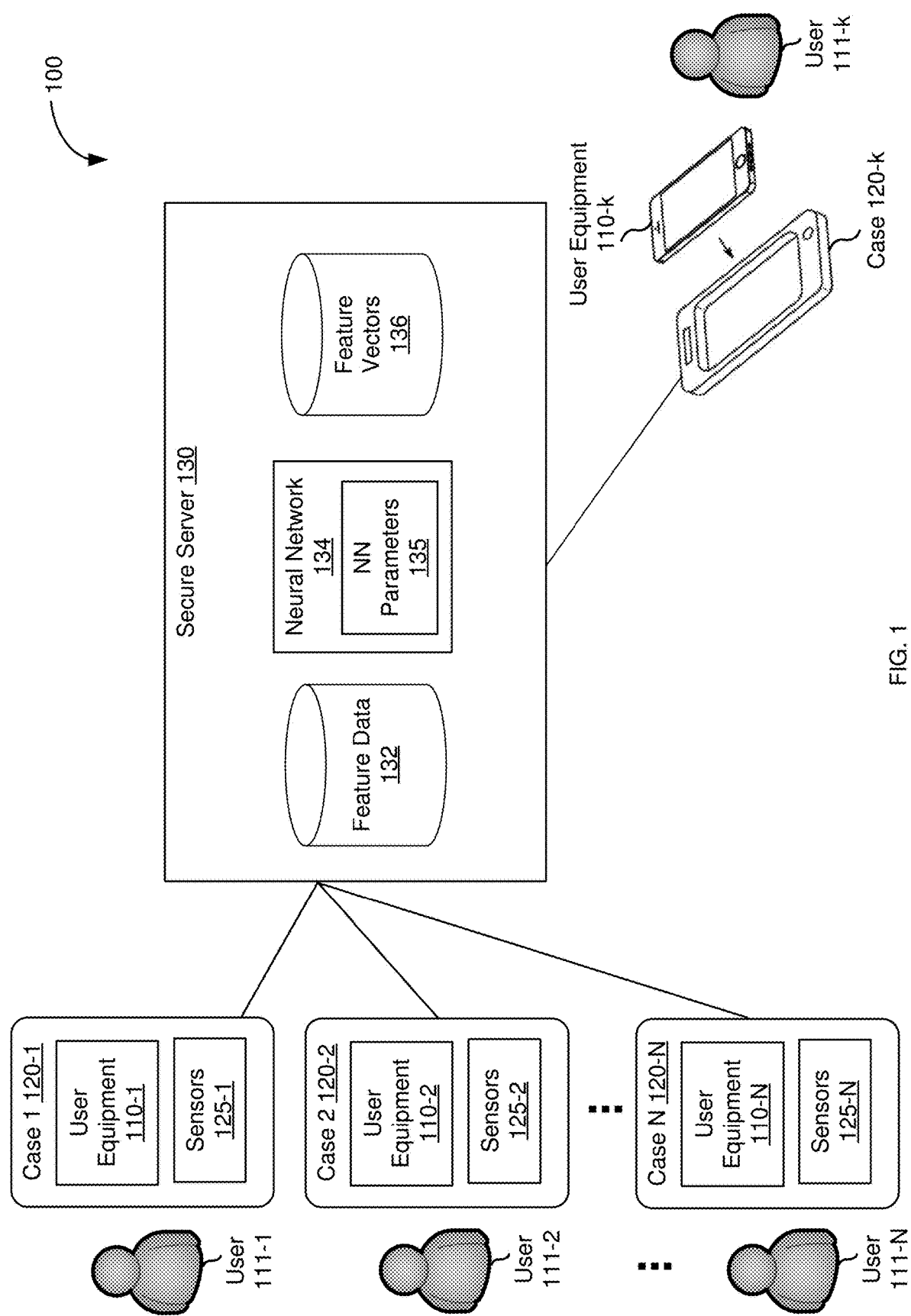
FIG. 1 is a system diagram of an exemplary secure platform for biometric identity and authentication (IDA) of users of user equipment in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus that is part of a secure platform providing improved continuous multi-factor authentication (CMFA). In particular, the secure platform disclosed herein in accordance with embodiments provides a physical unclonable function (PUF) that is ideal for authentication. A PUF typically has three properties. First, the PUF can be easily generated. Second, the PUF can be reliably evaluated. Third, it is impossible to predict or duplicate the PUF. In the secure platform disclosed herein, the apparatus disclosed herein holds the user equipment and collects multiple sources of time-varying biometric data of the user in accordance with some embodiments. As the user casually interacts with the user equipment, the secure platform disclosed herein receives the collected data from the apparatus and applies machine learning to derive patterns from the data in accordance with some embodiments. The learned patterns are then used as identities to provide CMFA of the user using the user equipment. In other words, in the secure platform disclosed herein, the authentication identity derived from the multi-source biometric data can be easily generated (e.g., as the user casually interacts with the user equipment), can be reliably evaluated (e.g., by evaluating multiple sources of biometric data from a plurality of users), and is difficult to predict or duplicate (e.g., the biometric features are time-varying). It naturally follows that the secure platform for biometric (IDA) disclosed herein provides strong privacy and security protection of the user equipment.

In accordance with some embodiments, a method (e.g., for training of a neural network) is performed at a device with one or more processors and a non-transitory memory storing instructions for execution by the one or more processors. In some embodiments, the method includes obtaining biometric data from a plurality of sources; extracting a plurality of feature vectors from the biometric data; determining a plurality of identifiability scores correspondingly associated with the plurality of feature vectors, wherein each of the plurality of identifiability scores provides a quantitative characterization of a relative uniqueness of a corresponding one of the plurality of feature vectors; and determining run-time authentication neural network parameters based on a function of the plurality of feature vectors, wherein the run-time authentication neural network parameters enable extraction of one or more feature vectors from biometric data of a particular user, and the run-time authentication neural network parameters are associated with the plurality of feature vectors determined to satisfy an error threshold.

In accordance with some embodiments, a method (e.g., for training of a neural network) is performed at a device with one or more processors and a non-transitory memory storing instructions for execution by the one or more processors. In some embodiments, the method includes obtaining biometric data from a plurality of sources; establishing a candidate set of neural network parameters; extracting a plurality of feature vectors from the biometric data using the candidate set of neural network parameters; determining whether or not the plurality of feature vectors match a training vector set within an error threshold; updating the candidate set of neural network parameters in response to determining that the plurality of feature vectors do not match the training vector set within the error threshold; selecting the candidate set of run-time authentication neural network parameters to be run-time authentication neural network parameters in response to determining that the plurality of feature vectors match the training vector set within the error threshold, wherein the run-time authentication neural network parameters enable extraction of one or more feature vectors from biometric data of a particular user; and determining a plurality of identifiability scores correspondingly associated with the plurality of feature vectors, wherein each of the plurality of identifiability scores provides a quantitative characterization of a relative uniqueness of a corresponding one of the plurality of feature vectors.

In accordance with some embodiments, a method (e.g., for authentication using a trained neural network) is performed at a first device arranged to hold a second device. In some embodiments, the method includes obtaining biometric data of a user of the second device; extracting from the biometric data, using an authentication neural network, a plurality of feature vectors associated with a plurality of identifiability scores; generating an authentication score as a function of the plurality of identifiability scores and the plurality of feature vectors, wherein each of the plurality of identifiability scores provides a quantitative characterization of a relative uniqueness of a corresponding one of a plurality of feature vectors; determining whether or not the authentication score satisfies an authentication threshold; and gating electronic access to the second device based on whether or not the authentication score satisfies the authentication threshold.

In accordance with some embodiments, an apparatus is disclosed that includes a housing arranged to hold a second device; one or more sensors, at least partially supported by the housing, operable to continuously collect biometric data of a user; a run-time authentication neural network, operable to extract from the biometric data a plurality feature vectors associated with a plurality of identifiable scores; a decision block, coupled to the run-time authentication neural network, operable to generate an authentication score as a function of the plurality of identifiability scores and the plurality of feature vectors, determine whether or not the authentication score satisfies an authentication threshold, and generate a lock signal to the second device in response to determining that the authentication score does not satisfy the authentication threshold; and a communication interface, connectable to the second device, operable to provide the lock signal to the second device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms "first", "second", etc., are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising" when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system- and business-related constraints), and that these goals will vary from one embodiment to another. It will also be appreciated that such development efforts might be complex and time consuming but would nevertheless be a routine undertaking for those of ordinary skill in the art of image capture having the benefit of this disclosure.

Referring to FIG. 1, a simplified block diagram of a secure platform 100 for continuous biometric IDA of users 111 of user equipment 110 is depicted, in accordance with some embodiments. Continuous biometric IDA typically works passively in the background of a device. It typically requires an initial registration phase (or an enrollment phase) and an authentication phase. In some embodiments, the secure platform 100 for continuous biometric IDA includes a server 130 (e.g., a secure server providing Software as a service (SaaS)), which further includes a neural network 134 for machine learning of biometric data obtained from a plurality of apparatuses 120. As used herein, the apparatus 120 is also referred to as a base 120, a case 120, an active base 120, or an active case 120. Though FIG. 1 illustrates a neural network 134 for machine learning, it should be appreciated that the embodiments are not limited to the neural network described herein. A variety of machine learning techniques can be used, including, for example, recurrent neural networks (RNN), random forest classifiers, Bayes classifiers (e.g., naive Bayes), principal component analysis (PCA), support vector machines, linear discriminant analysis, and the like. For the sake of brevity, conventional techniques related to the signal processing and data transmission for obtaining the input data for machine learning and the individual operating components of the machine learning may not be described in detail herein.

In the exemplary secure platform 100, each active case 120 holds a user equipment 110 (also referred to as a personal communication device 110, an electronic device 110, or a device 110). For example, each user equipment 110 can be slid or inserted into a housing (e.g., the housing 115 in FIG. 2) of the corresponding active case 120. This action is indicated in FIG. 1 by the arrow depicting a movement from the user equipment 110-k to the case 120-k. In some embodiments, during the enrollment phase, the user 111 accesses the user equipment 110 as usual, while sensors 125 of the active case 120 collect at least a portion of the biometric data to be communicated to the secure server 130. After observing the user's behavior for a period of time, the secure server 130 learns characteristics of the user's behavioral data by machine learning (e.g., by setting neural network parameters 135 in connection with neurons in the neural network 134), and the secure server 130 stores the learned patterns in feature vectors 136 for future reference. During the authentication phase, the active case 120 continuously compares current user behaviors with the learned user model stored in the feature vectors 136 to make an authentication decision and gates electronic access to the active case 120, e.g., locking or unlocking the user equipment 110 held by the active case 120.

In some embodiments, the user equipment 110 is a portable communications device, such as a mobile phone, a wearable device, a tablet, a laptop computer, a digital media player, an electronic reader, or the like. In some embodiments, the user equipment 110 is a non-portable device, such as a desktop computer, a data storage device, a smart TV, a video game console, a smart home appliance, or the like that is capable of storing and exchanging data wirelessly or through wire in a network (e.g., the Internet, wireless network, peer-to-peer network, optical network, Ethernet, intranet, wired network through connectors, and/or cables). It will be appreciated that the components, devices, or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

Figure 2:
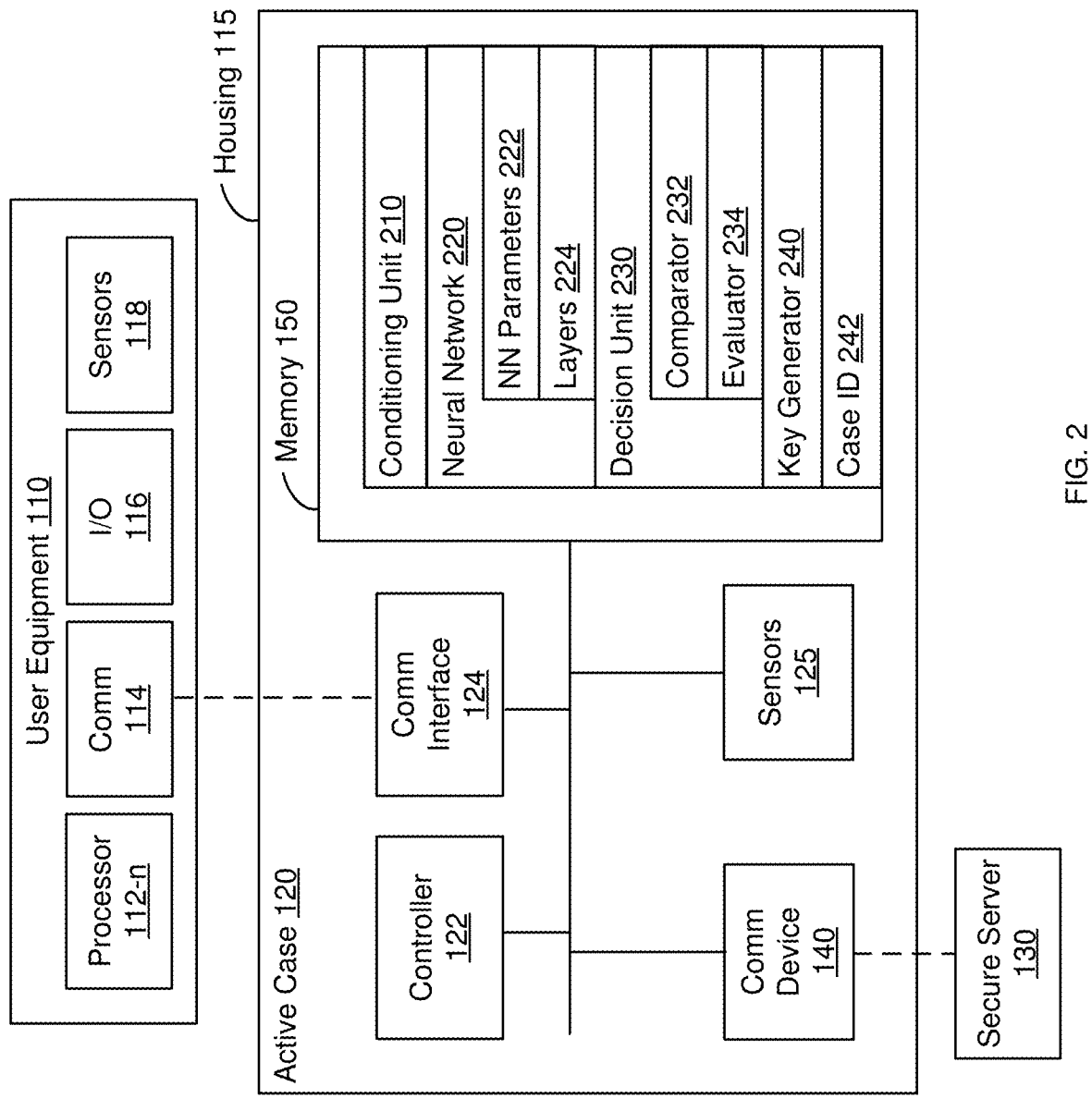
FIG. 2 is a block diagram illustrating exemplary devices and components in the secure platform in accordance with some embodiments.

FIG. 2 is a simplified block diagram illustrating an exemplary user equipment 110, an exemplary apparatus (e.g., the active base 120 or the active case 120), and an exemplary server 130 in the secure platform 100, in accordance with some embodiments. In some embodiments, the active case 120 includes a housing 115 arranged to hold the user equipment 110. Though not shown in FIG. 2, in some embodiments, the housing 115 includes a plurality of components mateable with one another. In other words, the plurality of components of the housing 115, once mated with one another, form an assembly to receive and hold the user equipment 110. The assembly allows a user 111 to insert the user equipment 110 into the active case 120 or take the user equipment 110 out of the active case 120. Different from a conventional base or case that merely holds a user equipment, the active case 120 actively monitors biometric data related to the user 111 of the user equipment 110 and provides continuous biometric IDA based on the biometric data.

In some embodiments, the user equipment 110 held by the active case 120 includes a processor 112, one or more communication devices 114, input/output devices 116, sensors 118, and memory for storing data as well as instructions executed by the processor 112. In some embodiments, the input/output devices 116 include a display (including a touch screen display), a touch-sensitive surface, a keyboard (virtual or physical), a mouse, a pen, microphones, cameras, and/or speakers. In some embodiments, the one or more communication devices 114 connect the user equipment 110 and an external electronic device wirelessly (e.g., using wireless modem) or through a wired connection. In some embodiments, the external electronic device is the active case 120, such that the one or more communication devices 114 connect to the active case 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to Long-Term Evolution (LTE), Wideband Code Division Multiple Access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the user equipment 110 includes sensors 118, such as one or more accelerometers, gyroscopes, and/or magnetometers (e.g., as part of an inertial measurement unit (IMU)) for obtaining information concerning the position (e.g., altitude) of the user equipment 110. In some embodiments, the sensors 118 are coupled to the input/output devices 116, e.g., touch sensors and/or force sensors coupled to a touch sensitive surface and/or a keyboard, sound sensors coupled to a microphone, or light sensors coupled to a camera. In some embodiments, the sensors 118 are coupled to the one or more communication devices 114, so that the information collected by the sensors 118 can be transmitted to another device (e.g., to the active case 120 via a communication interface 124) for validation, identification, and/or authentication of the user 111 of the user equipment 110.

In addition to the sensors 118 for biometric data collection, in some embodiments, the active case 120 holding the user equipment 110 also includes sensors 125 that independently collect biometric data of the user 111. In some embodiments, the sensors 125 include one or more accelerometers, gyroscopes, magnetometers (e.g., as part of an inertial measurement unit (IMU)), Global Positioning Systems (GPS), compasses, barometers, photometers and thermometers, touch sensors, force sensors, vibration sensors, motion recording sensors, light sensors, microphones for recording voice, electrocardiogram sensors, hydration sensors, and/or the like. The information collected by the sensors 125, in conjunction with the information collected by the sensors 118 of the user equipment 110, is used for validation, identification, and/or authentication of the user.

In some embodiments, the biometric data collected by the sensors 125 and/or 118 are communicated through a communication device 140 and/or a communication interface 124 of the active case 120. In some embodiments, the communications through the communication device 140 and/or the communication interface 124 are encrypted to form secure channels in order to further protect the secure platform 100. In some embodiments, the communication device 140, which is at least partially supported by the housing 115, connects the active case 120 to another electronic device, e.g., a different case 120, a different user equipment 110, or the secure server 130 wirelessly or through a wired connection. In some embodiments, the communication interface 124, which is also at least supported by the housing 115, is connectable to the user equipment 110 held by the active case 120, e.g., by connecting to the one or more communication devices 114 of the user equipment 110. The communication through the communication interface 124 can be wireless or wired. The wireless connections include, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to Long-Term Evolution (LTE), Wideband Code Division Multiple Access (W-CDMA), code division multiple access (CDMA), time division multiple access (TDMA), or Global System for Mobile Communications (GSM). The wired connections include for example, a Universal Serial Bus (USB) connector, a High Definition Multimedia Interface (HDMI) connector, a Lightning® (a registered trademark of Apple Inc. of Cupertino, Calif.) connector, and/or contact pins or pads. Through the communication interface 124, the active case 120 receives data (e.g., biometric data sensed by sensors 118 of the user equipment 110) from the user equipment 110, sends the data to the secure server 130 during the enrollment phase, and sends signals (e.g., locking or unlocking) to the user equipment 110 based on a decision made at the active case 120 during the authentication phase.

In some embodiments, the active case 120 includes circuitry (e.g., a bus) that interconnects components of the active case 120, including the communication interface 124, the communication device 140, and the sensors 125. In some embodiments, the active case 120 further includes a controller 122 that controls various components of the active case 120. In some embodiments, the controller 122 is on a single chip or chipset. The controller 122 can be embodied in a variety of forms, e.g., as various hardware-based processing means, as instructions stored in memory 150 and executed by a processor, or as a combination of hardware, firmware, and software.

In some embodiments, the active case 120 includes memory 150, which further includes high-speed random-access memory, such as DRAM, SRAM, DDR RAM, or other random access solid state memory devices, and non-volatile memory, such as one or more magnetic disk storage devices, optical disk storage devices, flash memory devices, or other non-volatile solid-state storage devices. In some embodiments, the memory 150, including the non-volatile and volatile memory device(s) within the memory 150, comprises a non-transitory computer readable storage medium. In some embodiments, the memory 150 or the non-transitory computer readable storage medium of the memory 150 stores the following programs and data structures, or a subset thereof including a conditioning unit 210, a neural network 220, a decision unit 230, and a key generator 240.

In some embodiments, the conditioning unit 210 receives the signals from the sensors 125 and/or 118 and preprocesses the signals. For example, for voice or audible signals captured by the sensors 125 and/or 118, the conditioning unit 210 conditions the signals by generating temporal frames of the audible signals, filtering, isolating and/or emphasizing certain portions of the frequency spectrum, adjusting the spectral composition of the temporal frames, converting the audible signals into a frequency domain representation, and/or producing (rectifying) an absolute value (e.g., modulus value) signal for each temporal frame, and/or the like. In another example, the conditioning unit 210 conditions the IMU signals in preparation for gait feature extraction by performing spectral analysis of the IMU signals and applying a low pass filter to the raw IMU signals. In yet another example, for electrocardiogram (ECG) signals, the conditioning unit 210 applies a finite impulse response (FIR), performs R-peak detection, removes outliers, and normalizes the signals prior to feature extraction.

Those of ordinary skill in the art will appreciate that though FIG. 2 illustrates one conditioning unit 210, the function of the conditioning unit 210 can be further subdivided into additional units. In some embodiments, the conditioning unit 210 comprises a plurality of conditioning units with one for conditioning a type of biometric signals or a characteristic of biometric signals, e.g., one for ECG signals or R-peak detection of the ECG signals, one for audio signals or frequency spectrum shaping, one for motion signals or one for IMU signals, and/or the like. In some embodiments, the conditioning unit 210 takes biometric traits from different sensors, and combines them to form a composite biometric trait and conditions the composite biometric trait in preparation for feature extraction, e.g., combining IMU and location signals as indicators for gait feature extraction. The aforementioned functions performed by the conditioning unit 210 are provided merely as examples of the various aspect and functions described herein.

In some embodiments, the neural network 220 is installed on the active case 120 and neural network parameters are downloaded prior to authenticate the user 111 of the user equipment 110. In some embodiments, the neural network 220 includes a plurality of layers 224, including an input layer coupled to receive the conditioned signal from the conditioning unit 210, and a number of layers adjacent the input layer, e.g., hidden layer(s) adjacent the input layer and an output layer adjacent the hidden layer(s). In some embodiments, the plurality of layers 224 include logical units, e.g., neurons, as referred to by those of ordinary skill in the art, such that each neuron consists of inputs and an output with the output as a function of the inputs and each input is modified by a weight. Once the neural network 134 on the server 130 is trained, the weights are downloaded to the active case 120 and stored as the neural network parameters 222 of the neural network 220 in accordance with some embodiments. The learned weights are then used by the neural network 220 during the authentication phase for feature extraction.

In some embodiments, the feature vectors extracted by the neural network 220 are provided to the decision unit 230 coupled to the neural network 220. In some embodiments, the neural network 220 outputs the feature vectors along with a plurality of identifiability scores, each of which provides a quantitative characterization of a relative uniqueness of a corresponding one of the plurality of feature vectors. In some embodiments, based on the outputs from the neural network 220, the decision unit 230 generates an authentication score as a function of the plurality of identifiability scores and the plurality of feature vectors. In some embodiments, the decision unit 230 also determines whether or not the authentication score satisfies an authentication threshold, and gates electronic access to the user equipment 110 based on whether or not the authentication score satisfies the authentication threshold. In some embodiments, the decision unit 230 includes a comparator 232 to compare the feature vectors extracted by the neural network 220 with the plurality of feature vectors 136 in order to derive a difference. In some embodiments, the decision unit 230 includes an evaluator 234 to determine an authentication score based on the input and to provide an indication of whether the authentication score is stable based on the difference.

The authentication score provides a foundation on which access policy decisions are made. For example, if the decision unit 230 determines that the authentication score generated for a user satisfies the authentication threshold (e.g., falls within an acceptable range) for accessing a system comprising the user equipment 110, the active case 120, and/or the secure server 130, the user would be allowed into the system. On the other hand, in some embodiments, if the decision unit 230 determines that the authentication score fails to satisfy the authentication threshold (e.g., falls below the acceptable range), the decision unit 230 can challenge the user, e.g., ask the user to provide one or more specified biometric traits. Further, parameters associated with the neural network 220 can be adjusted based on policy and ever-evolving capabilities and information. For example, as sufficient data is gathered in certain sensor categories, a new trait can be enabled and the corresponding biometric data can be gathered through new sensors and used as part of the multi-factor authentication. In another example, as the neural network 220 is enhanced or found to be vulnerable to certain new attacks, administrators can adjust weights assigned to features associated with traits used in the new attacks.

In some embodiments, the key generator 240 derives an authentication key from the feature vectors outputted by the neural network 220. For example, upon obtaining feature vectors from the neural network 220, the key generator 240 takes the most significant bits of the features of the obtained feature vectors, and generates a bit stream. The bit stream provides a random number that can be used as a secret key for authentication, data encryption, and/or decryption. In some embodiments, the key generated by the key generator 240 is provided to the decision unit 230 for generating the authentication score as a function of the plurality of identifiability scores and the authentication key. In other words, the randomized key becomes one factor of the multi-factor authentication.

In some embodiments, the active case 120 includes a secure storage to store an identifier 242 (e.g., a case identifier) of the active case 120. In some embodiments, the decision unit 230 retrieves the identifier 242 from the secure storage and generates the authentication score as a function of the plurality of identifiability scores, the plurality of feature vectors outputted from the neural network 220, and the identifier 242. In other words, the case identifier 242 is part of the multi-factor authentication that provides a "what you have" factor in the authentication scheme disclosed herein.

For example, a third-party can steal the IMU data via many means, e.g., by luring the user to a website and running malicious code without the user's knowledge, even when the smart device is locked. The third party can then use the IMU data and attempt to produce an authentication score based on gait, typing, and/or tremor etc. Knowing someone can steal or spoof the CMFA to certain degree, the secure platform 100 adds the case identifier to the authentication score calculation, so that the third party would need to have the physical device (the case 120) to pass the authentication. As such, by including the case identifier 242 as part of the CMFA, the secure platform 100 prevents an attacker from remotely impersonating the user 111, e.g., by knowing their credentials or stealing/spoofing the user's biometric data.

Figure 3:
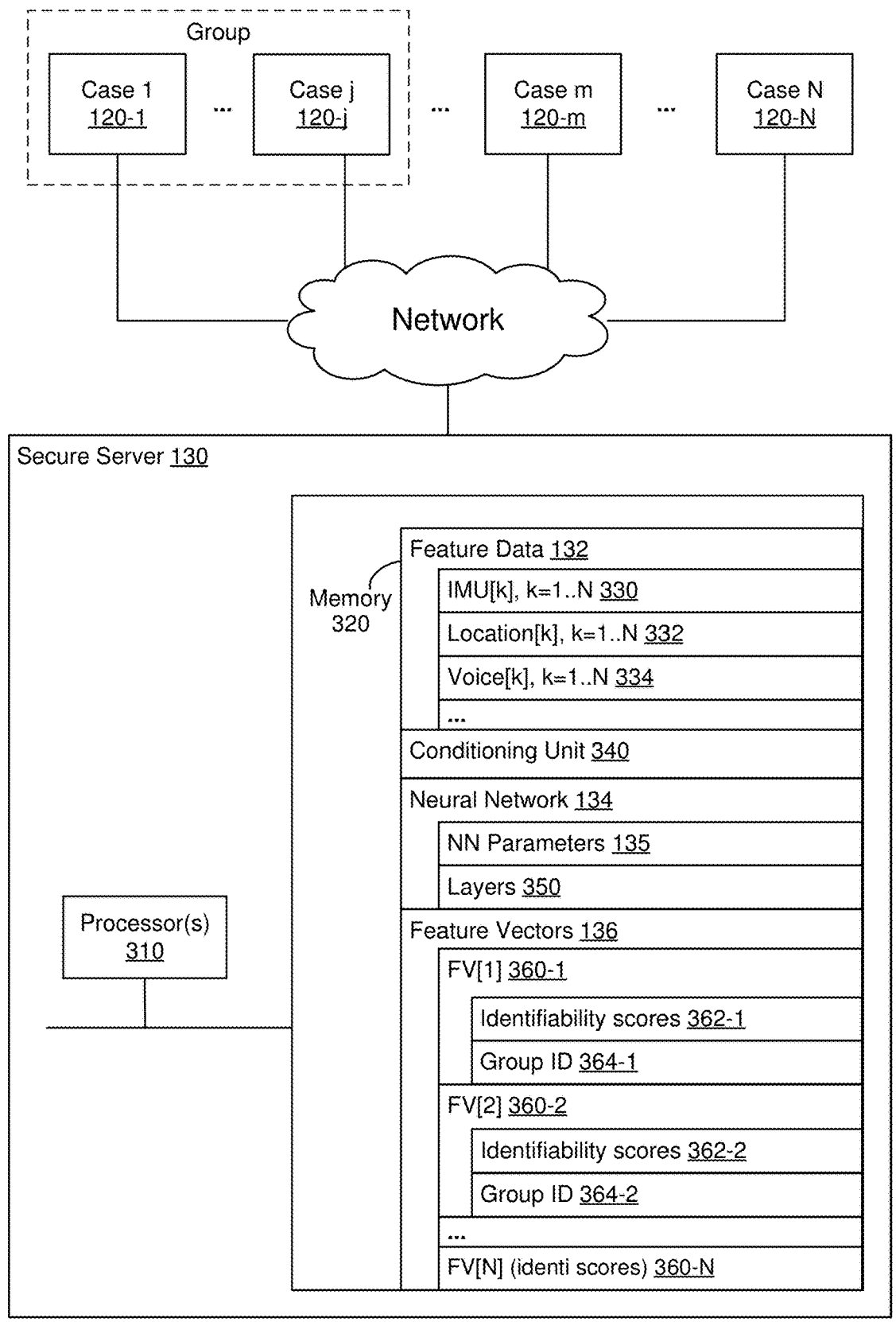
FIG. 3 is a block diagram illustrating exemplary apparatuses and an exemplary server in the secure platform in accordance with some embodiments.

FIG. 3 is a simplified block diagram illustrating exemplary apparatuses 120 and an exemplary server 130 in the secure platform 100, in accordance with some embodiments. In some embodiments, the server 130 is a secure server that communicates with the plurality of cases 120 through a secure channel, e.g., data exchanged between the case 120 and the server 130 are encrypted using a key generated by the key generator 240 of the case 120. In some embodiments, the secure server 130 includes one or more processors 310, a network interface (not shown), and a non-transitory memory 320 storing instructions for execution by the one or more processors 310. As shown, the one or more processors 310 are interconnected with the non-transitory memory 320 and the network interface 311, and the server 130 is connected to the network via the network interface 311.

In some embodiments, the non-transitory memory 320 includes high-speed random-access memory, such as DRAM, SRAM, DDR RAM, or other random access solid state memory devices, and non-volatile memory, such as one or more magnetic disk storage devices, optical disk storage devices, flash memory devices, or other non-volatile solid-state storage devices. In some embodiments, the non-transitory memory 320, including the non-volatile and volatile memory device(s) within the non-transitory memory 320, comprises a non-transitory computer readable storage medium. In some embodiments, the non-transitory memory 320 or the non-transitory computer readable storage medium of the non-transitory memory 320 stores the following programs and data structures, or a subset thereof including the feature data 132, a conditioning unit 340, the neural network 134, and the feature vectors 136.

In some embodiments, the server 130 receives the biometric data from a plurality of active cases 120 (e.g., active case 120-1, . . . , active case 120-j, . . . , active case 120-m, . . . , active case 120-N) that aggregates the biometric data from multiple sources and stores the aggregated data according to the type or characteristic in the feature data 132. For example, data collected by IMU sensors of the apparatuses 120 and/or the user equipment 110 are stored as IMU data 330 (e.g., IMU[k], where k=1 . . . N). In another example, data collected by GPS and/or compass units of the apparatuses 120 and/or the user equipment 110 are stored as location data 332 (e.g., location[k], where k=1 . . . N). In yet another example, data collected by microphones of the apparatuses 120 and/or the user equipment 110 are stored as voice data 334 (e.g., voice[k], where k=1 . . . N).

Considering the limited computational and storage resources in the active case 120, the training of the neural network 134 is executed on the secure server 130. In some embodiments, in preparation for the training, the conditioning unit 340 retrieves the feature data 132 stored in the non-transitory memory 320 (e.g., the IMU data 330, the location data 332, the voice data 334, and/or the like), and performs the signal conditioning function described above with reference to the conditioning unit 210 of the active case 120. The conditioned data are then provided to the neural network 134 for training. During training, in some embodiments, the neural network 134 learns representative features at the layers 350 through the setting of the neural network parameters 135. As such, the values of the weight matrices are adjusted during the training until an error convergence threshold is satisfied. Various training methods in accordance with embodiments are described below with reference to FIGS. 5-8. Once the neural network 134 is trained, the server 130 stores the extracted feature vectors 136 and the neural network parameters 135. In addition, the server 130 determines a plurality of identifiability scores 362 correspondingly associated with the feature vectors and stores as part of the feature vectors 136. For example, feature vectors 360-1 for case 1 120-1 are associated with identifiability scores 362-1. In some embodiments, each of the plurality of identifiability scores 362 provides a quantitative characterization of a relative uniqueness of a corresponding one of the plurality of feature vectors. For example, an identifiability score of 20% for voice-related features vectors provides a quantitative characterization of the relative uniqueness of the voice related feature vectors. The feature vectors 136, which include the identifiability scores 362 for the corresponding feature vectors 360, and the neural network parameters 135 are then used for authentication, as will be described in detail below with reference to FIGS. 8 and 9.

In some embodiments, the plurality of cases 120 are divided into groups, as shown in FIG. 3. The neural network 134 is trained for each group. As will be described below with reference to FIG. 6, smaller-sized groups allow for deeper data depth and the neural network 134, once trained, can provide better feature vectors. The extracted features are stored in the feature vectors 136 and associated with group identifiers 364, e.g., feature vectors for case 1 360-1 are associated with the group identifier 364-1, and feature vectors for case 1 360-2 are associated with the group identifier 364-2, etc.

Figure 4:
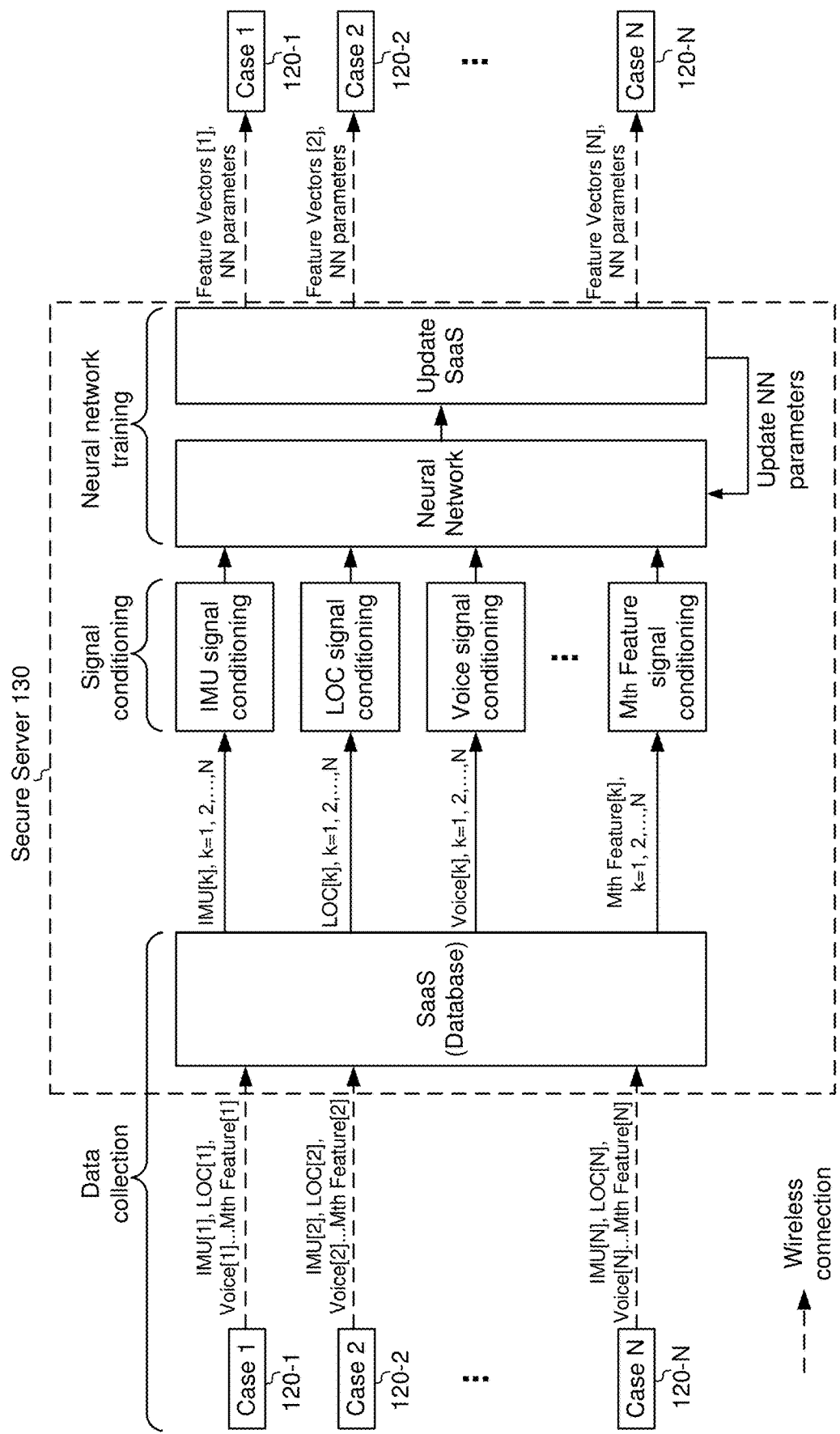
FIG. 4 is an illustration of data collection and machine learning in the secure platform in accordance with some embodiments.

FIG. 4 is a simplified block diagram illustrating the data collection and machine learning in the secure platform 100, in accordance with some embodiments. During the training phase, the server 130 (e.g., a secure server providing SaaS) obtains biometric data from a plurality of apparatuses 120 (e.g., case 1 120-1, case 2 120-2, . . . , case N 120-N as shown in FIGS. 1 and 3), e.g., via wireless connections. Upon receiving the data, the secure server 130 stores the data in a SaaS database (e.g., the feature data 132 in FIGS. 1 and 3) and labels the data. For example, IMU[1], Location[1], Voice[1], M-th feature[1] are labeled as biometric data from case[1], IMU[1], Location[2], Voice[2], M-th feature[2] are labeled biometric data from case[2] . . . IMU[N], Location[N], Voice[N], M-th feature[N] are labeled as biometric data from case[N]. In some embodiments, the secure server 130 aggregates the data by characteristics of the biometric feature associated with the data, such as combining the IMU data from N cases 120 as IMU[k], where k=1, 2, . . . , N, combining the location data from N cases 120 as Location[k], where k=1, 2, . . . , N, combining the voice data from N cases 120 as Voice[k], where k=1, 2, . . . , N, and combining the M-th feature from N cases 120 as M-th feature[k], where k=1, 2, . . . , N. In some embodiments, the aggregated data are also stored in the SaaS database (e.g., in the feature data 132 in FIGS. 1 and 3).

It should be noted that the data stored in the SaaS database can be raw signal data or signal data that has already been preprocessed by the cases 120. In either scenario, the secure server 130 can further condition the data stored in the SaaS database (e.g., with the conditioning unit 340, FIG. 3) in preparation for feature extraction. As explained above with reference to FIG. 3, in some embodiments, the conditioning unit 340 comprises a plurality of conditioning units with one for conditioning a type or a characteristic of biometric signals. As such, as shown in FIG. 4, an IMU signal conditioning unit conditions the aggregated IMU data IMU [k], where k=1, 2, . . . , N; a location signal conditioning unit conditions the aggregated location data Location[k], where k=1, 2, . . . , N; a voice signal conditioning unit conditions the aggregated voice data Voice[k], where k=1, 2, . . . , N; and a Mth feature signal conditioning unit for conditioning the aggregated M-th feature signal M-th feature[k], where k=1, 2, . . . , N, etc. The conditioned signals are then provided to the neural network for training.

Once receiving the conditioned signals, the neural network updates the neural network parameters as shown in FIG. 4 during the neural network training. As explained above with reference to FIG. 3, the layers 350 of the neural network 134 include an input layer coupled to the conditioning unit 340 and a number of layers adjacent to the input layer, e.g., hidden layer(s) and an output layer. In some embodiments, the layers 350 include logical units, i.e., neurons as referred to by those of ordinary skill in the art, such that each neuron consists of inputs and an output with the output as a function of the inputs and each input is modified by a weight. The neural network 134 learns representative features at the layers 350 through the setting of neural network parameters 135 (e.g., adjusting automatically according to policy or adjusting manually by administrators), such that the values of the weight matrices are adjusted during the training until an error convergence threshold is satisfied. For example, after receiving generic voice data from many people representing the population. The voice data can be labeled with speaker identifier and segments of speech (e.g., voice print). During the training stage, the neural network parameters are adjusted and the feature vectors are back-propagated, so that once trained, the neural network can be used for voice authentication. Various training methods are described below in detail with reference to FIGS. 5-8. Once the neural network is trained, the secure server 130 stores the feature vectors and the neural network parameters (e.g., in the feature vectors 136 and the neural network parameters 135, FIG. 3). The feature vectors and the neural network parameters are then used for each case 120 during authentication, as will be described in detail below with reference to FIGS. 8 and 9.

Figure 5:
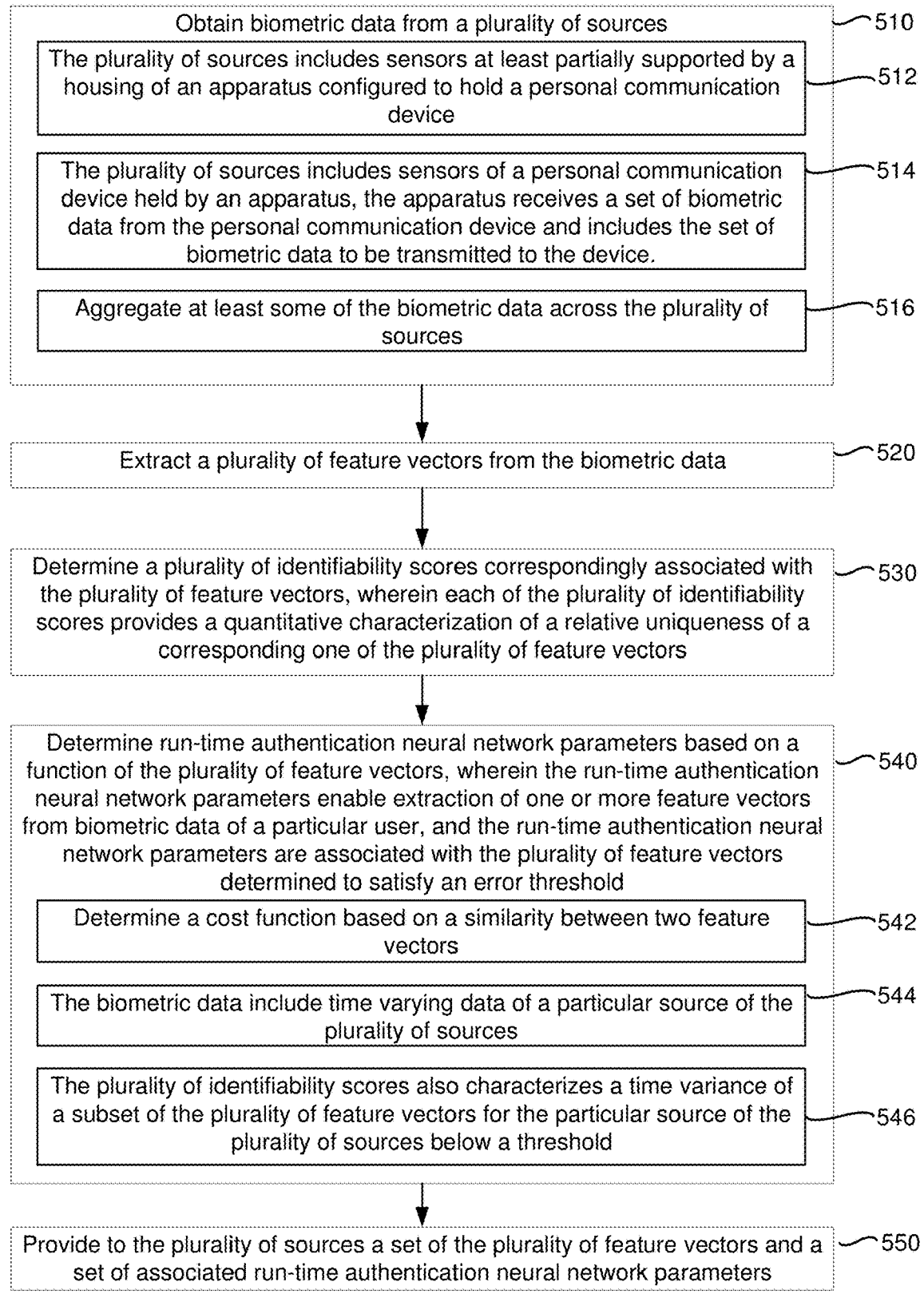
FIG. 5 is a flow diagram illustrating a neural network training method in accordance with some embodiments.

FIG. 5 is a flowchart representation of a neural network training method 500, in accordance with some embodiments. In some embodiments, the method 500 is performed at a device (e.g., the server 130) with one or more processors (e.g., the processor(s) 310, FIG. 3) and a non-transitory memory (e.g., the non-transitory memory 320, FIG. 3) storing instructions for execution by the one or more processors. As represented by block 510, the method 500 includes obtaining biometric data from a plurality of sources. In some embodiments, as represented by block 512, the plurality of sources includes sensors (e.g., the sensors 125) at least partially supported by a housing (e.g., the housing 115, FIG. 2) of an apparatus (e.g., the case 120) configured to hold a personal communication device (e.g., the user equipment 110). In some embodiments, as represented by block 514, the plurality of sources includes sensors (e.g., the sensors 118, FIG. 2) of a personal communication device (e.g., the user equipment 110) held by an apparatus (e.g., the case 120). In such embodiments, the active base 120 receives a set of biometric data from the user equipment 110 and includes the set of biometric data as part of the biometric data to be transmitted to the device (e.g., the server 130). In other words, the plurality of active bases 120 obtain biometric data using the sensors 125 on the active bases 120, and each of the plurality of active bases 120 can also obtain data from the corresponding user equipment 110 held by the case 120. Thus, the plurality of sources can be the active bases 120 and/or the user equipment 110 in accordance with some embodiments.

In some embodiments, as represented by block 516, upon obtaining the biometric data from the plurality of sources, the method 500 further includes aggregating at least some of the biometric data across the plurality of sources. For example, as shown in FIG. 3 and explained above, the server 130 combines the IMU data 330, the location data 332, and the voice data 334 from N cases 120 and stores as IMU[k], Location[k], and Voice[k] in the feature data 132, where k=1, 2, . . . , N. In some embodiments, as represented by block 520, the method 500 further includes extracting a plurality of feature vectors 136 from the biometric data. Various embodiments of the feature vector extraction are described in detail below with reference to FIG. 6.

In some embodiments, as represented by block 530, the method 500 further includes determining a plurality of identifiability scores correspondingly associated with the plurality of feature vectors 360, where each of the plurality of identifiability scores provides a quantitative characterization of a relative uniqueness of a corresponding one of the plurality of feature vectors. For example, certain features of voice are 20% unique for different people, while fingerprints are 90% unique among a certain population. Thus, by associating an identifiability score of 20% with the plurality of feature vectors 360 extracted from the voice signals, the identifiability score quantitates the relative uniqueness of features associated with voice.

In some embodiments, as represented by block 540, the method 500 further includes determining run-time authentication neural network parameters 135 based on a function of the plurality of feature vectors 136. In some embodiments, the run-time authentication neural network parameters 135 enable extraction of one or more of the plurality of feature vectors 136 from biometric data of a particular user, and the run-time authentication neural network parameters 135 are associated with the plurality of feature vectors 136 determined to satisfy an error threshold. Various embodiments of the run-time authentication neural network parameters 135 determination are described below in details with reference to FIGS. 7 and 8.

In some embodiments, as represented by block 542, the method 500 further includes determining a cost function based on a similarity between two feature vectors 136 for training the neural network 134. In some embodiments, the cost function correlates with the error convergence threshold for training of the neural network 134. For example, by minimizing the cost function, the error threshold is also lowered. In some embodiments, as represented by block 544, the biometric data include time varying data of a particular source of the plurality of sources. In such embodiments, as represented by block 546, the plurality of identifiability scores also characterizes a time variance of a subset of the plurality of feature vectors 136 for the particular source of the plurality of sources below a threshold.

For example, in order to learn and extract features that are maximally different for different individuals (inter-subject) and minimally different for the same individual (intra-subject) over time, a cost function can be based on the intra-subject similarity distribution and standard deviation as well as the inter-subject similarity distribution and standard deviation. Using such cost function to train the last hidden layer, the extracted feature vectors 136 can differentiate a third part from an authorized user and recognize the authenticated user over time even though certain biometric data of the authenticated user have time-varying characteristics.

In some embodiments, as represented by block 550, the method 500 further includes providing to the plurality of sources a set of the plurality of feature vectors 136 and a set of associated run-time authentication neural network parameters 135. For example, during the authentication phase, the top five features that provide the most unique statistical characterizations of a particular user can be suggested to the user 111 as features for authentication. Alternatively, the user can choose a set of the features for authentication and the secure server 130 provides the corresponding set of feature vectors 136 for authentication.

Figure 6:
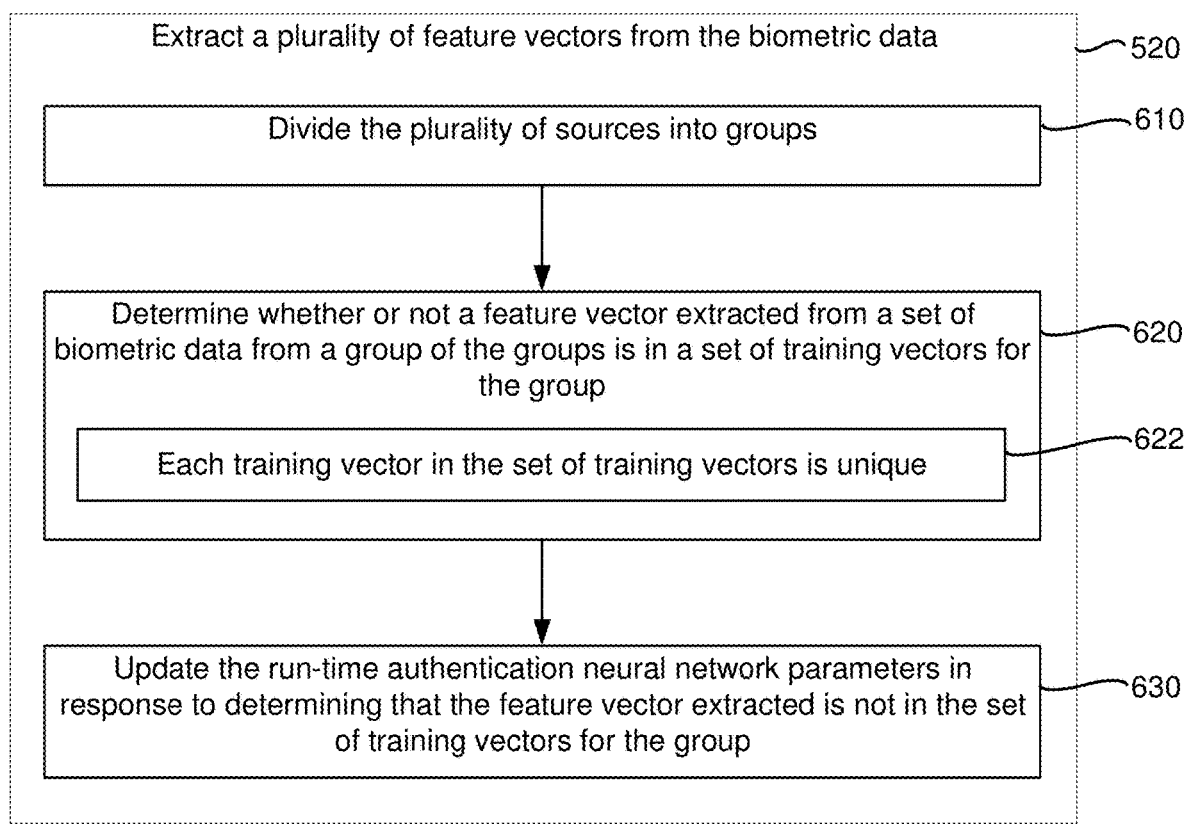
FIG. 6 is a flow diagram illustrating a method of feature extraction in accordance with some embodiments.

FIG. 6 is a flowchart representation of a method 600 of feature extraction, in accordance with some embodiments. Specifically, the method 600 illustrates extracting features from biometric data obtained by a small group of cases 120, e.g., cases 1, j shown in FIG. 3. The method 600 is one embodiment of the feature extracting step represented by block 520 (FIG. 5).

In some embodiments, as represented by block 610, the method 600 includes dividing the plurality of sources into groups. For example, as shown in FIG. 3, a subset of the cases 120 1, N, e.g., cases 1, j are included in a group. In some embodiments, as represented by block 620, the method 600 further includes determining whether or not a feature vector extracted from a set of biometric data from a group of the groups is in a set of training vectors for the group, where, as represented by block 622, each training vector in the set of training vectors is unique. In some embodiments, as represented by block 630, the method 600 further includes updating the run-time authentication neural network parameters 135 in response to determining that the feature vector extracted is not in the set of training vectors for the group. In other words, the feature vector extracted during training only needs to be unique within a group. This allows for a wider distance between the mean of inter-subject normal distribution and the inter-subject standard deviation. As such, training on smaller groups enables deeper data depth and provides better feature vectors.

Figure 7:
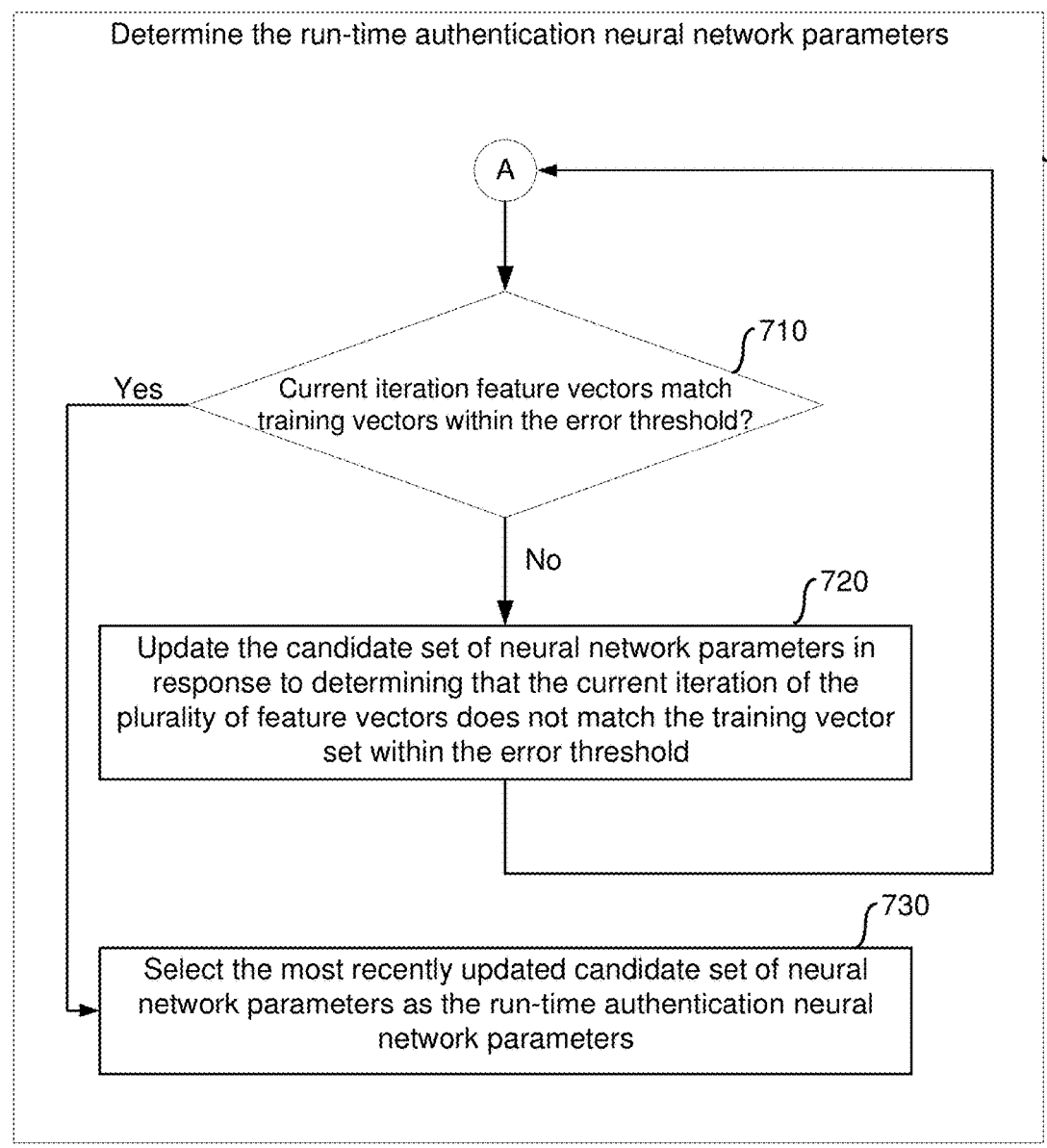
FIG. 7 is a flow diagram illustrating a method of determining run-time authentication neural network parameters in accordance with some embodiments.

FIG. 7 is a flowchart representation of a method 700 of determining the run-time authentication neural network parameters 135, in accordance with some embodiments. The method 700 is one embodiment of the run-time authentication neural network parameters 135 determining step represented by block 540 (FIG. 5).

In some embodiments, the method 700 includes an iterative process. In some embodiments, a candidate set of neural network parameters 135 is chosen based on best guess or randomized assignment. During a current iterative process A, as represented by the decision block 710, the method 700 includes obtaining a plurality of feature vectors 136 using the candidate set of neural network parameters 135, and determining whether or not the current iteration of the plurality of feature vectors 136 match a training vector set within the error threshold. In some embodiments, in response to determining that the current iteration of the plurality of feature vectors 136 does not match the training vector set within the error threshold ("No" path from block 710), the method 700 includes updating the candidate set of neural network parameters 135, as represented by block 720. In some embodiments, as shown in FIG. 7, after updating the candidate set of neural network parameters 135 as represented by block 720, the iterative process returns to the beginning of the method 700. In some embodiments, in response to determining that the current iteration of the plurality of feature vectors 136 matches the training vector set within the error threshold ("Yes" path from block 710), the method 700 includes ceasing the iterative process 700 and selecting the most recently updated candidate set of neural network parameters 135 as the run-time authentication neural network parameters 135, as represented by block 730.

Figure 8:
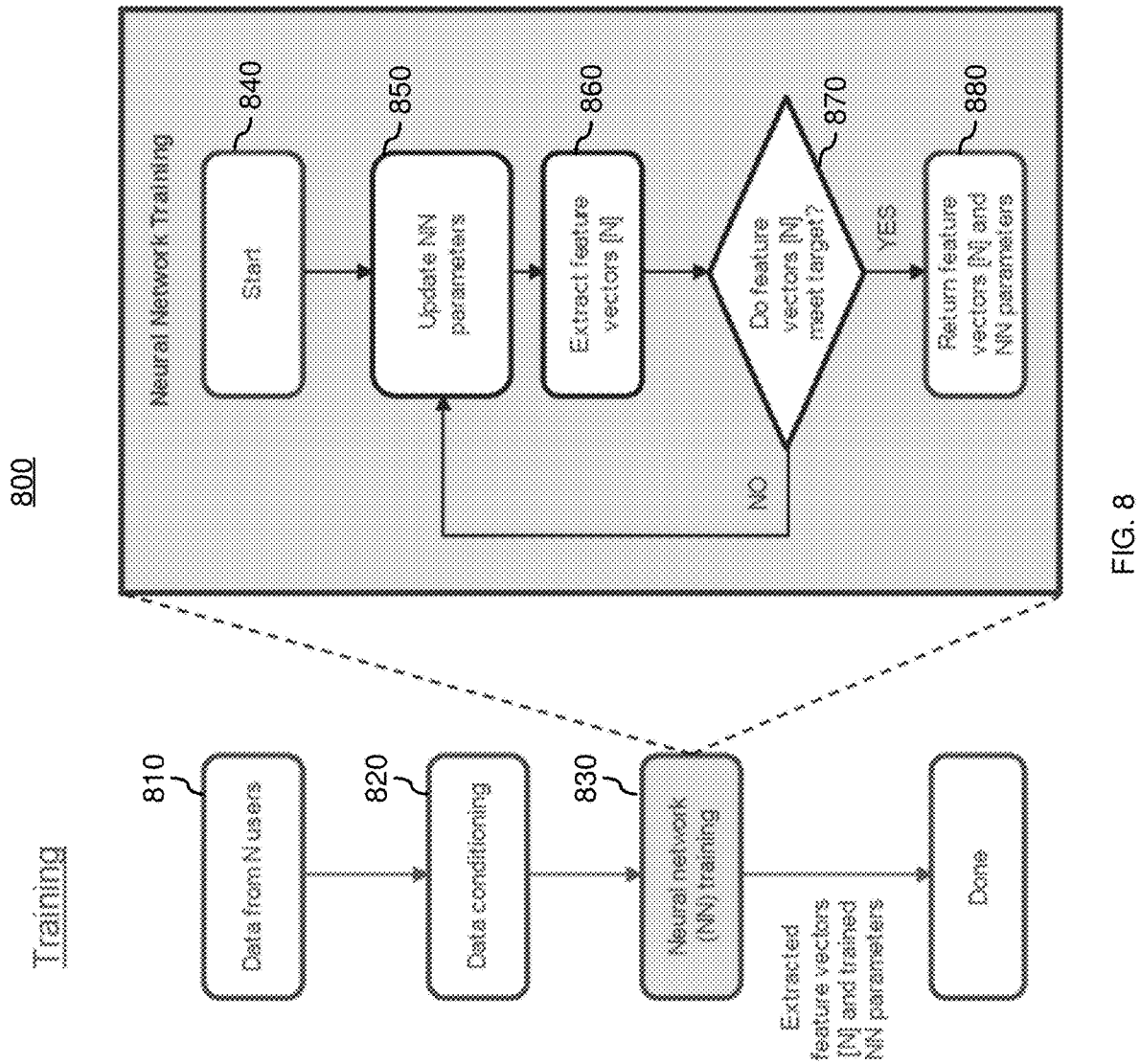
FIG. 8 is a flow diagram illustrating another neural network training method in accordance with some embodiments.

FIG. 8 is a flowchart representation of another embodiment of a neural network training method 800. In some embodiments, the method 800 is performed at a device (e.g., the server 130) with one or more processors (e.g., the processor(s) 310) and a non-transitory memory (e.g., the memory 320) storing instructions for execution by the one or more processors. As represented by block 810, the method 800 includes obtaining biometric data from a plurality of sources used by a plurality of users, e.g., N cases 120 with each case holding one user equipment 110 used by a respective user 111, FIG. 1. As represented by block 820, in some embodiments, the method 800 includes conditioning the biometric data, which further includes filtering the biometric data to remove outliers and normalizing the biometric data. In some embodiments, as represented by block 830, the method 800 includes a neural network training process in order to extract feature vectors 136 and generate trained neural network parameters 135.

In some embodiments, the neural network training process 830 includes first establishing a candidate set of neural network parameters 135. For example, as represented by block 840, the neural network training process can start based on best guess or randomized assignment of the neural network parameters 135. The neural network parameters 135 to the candidate set of neural network parameters 135 are then updated according to methods described above with reference to FIGS. 4-7, as represented by block 850. In some embodiments, as presented by block 860, the method 800 includes extracting a plurality of feature vectors 136 (e.g., electrocardiogram, voice, IMU feature vectors, and/or the like) from the biometric data using the candidate set of neural network parameters 135. In some embodiments, as represented by block 870, the method 800 includes determining whether or not the plurality of feature vectors 136 match a training vector set within an error threshold. In response to determining that the plurality of feature vectors 136 do not match the training vector set within the error threshold ("No" path from block 870), the method 800 includes returning to block 850 to update the candidate set of neural network parameters 135. On the other hand, in response to determining that the plurality of feature vectors 136 match the training vector set within the error threshold ("Yes" path from block 870), as represented by block 880, the method 800 includes selecting the candidate set of run-time authentication neural network parameters 135 to be run-time authentication neural network parameters 135, where the run-time authentication neural network parameters 135 enable extraction of one or more feature vectors 136 from biometric data of a particular user. Though not shown in FIG. 8, in some embodiments, the method 800 includes determining a plurality of identifiability scores correspondingly associated with the plurality of feature vectors 136, where each of the plurality of identifiability scores provides a quantitative characterization of a relative uniqueness of a corresponding one of the plurality of feature vectors 136.

Figure 9:
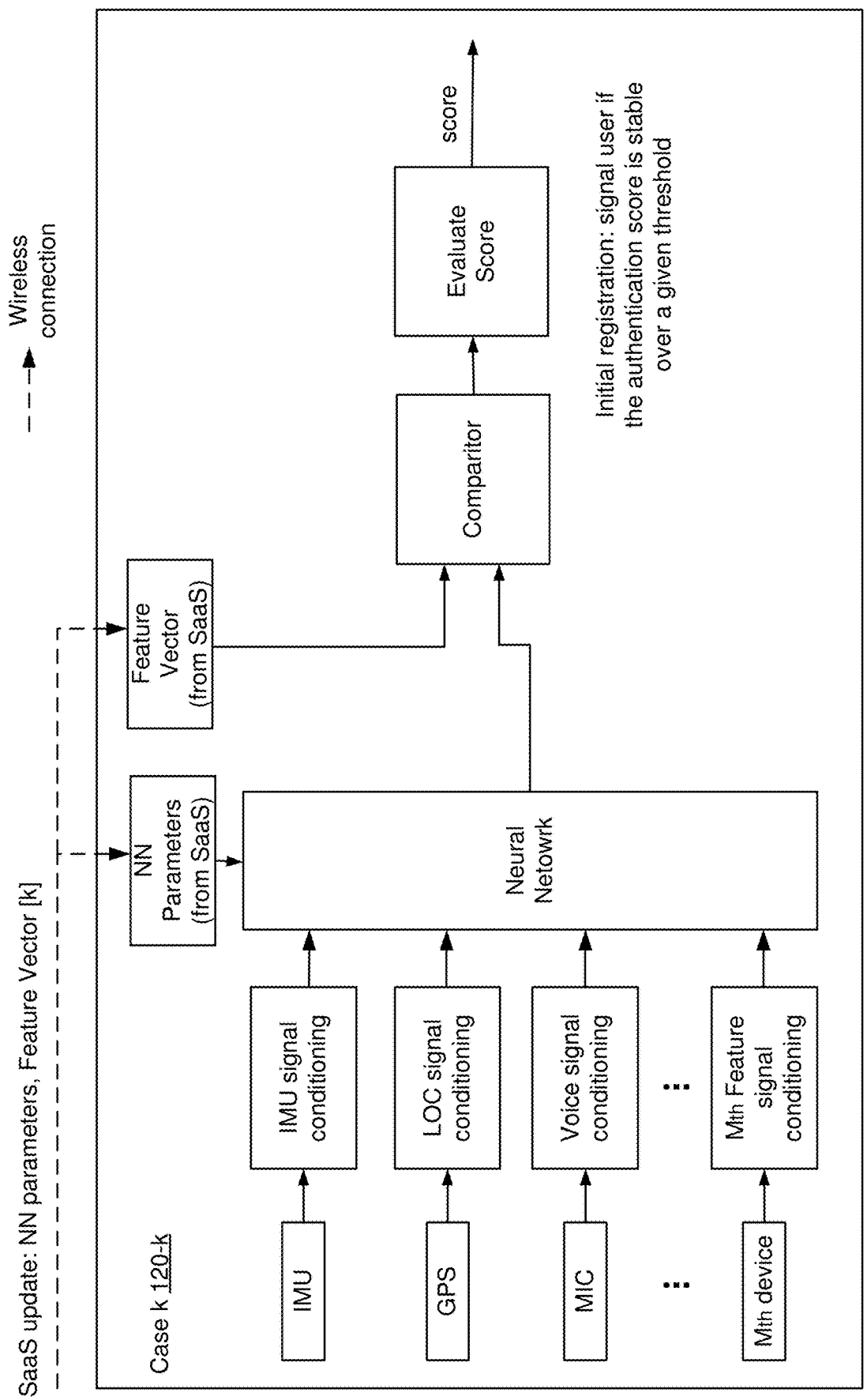
FIG. 9 is a block diagram illustrating performing biometric IDA on an active case during registration in accordance with some embodiments.

FIG. 9 is a simplified block diagram of biometric identity and authentication performed on the active case 120 during registration, in accordance with some embodiments. Prior to performing the authentication, a case, e.g., case[k] has the neural network (e.g., the neural network 220) installed on the case 120-$k$. During the enrollment phase, the user 111 accesses the user equipment 110-$k$ held by the case 120-$k$ as usual, while the sensors 125 and/or 118 record the biometric data and generate signals (e.g., the IMU signals, location signals, voice signals and/or the like) as the user 111 performs normal activities. After observing the user behavior for a first period of time, the server 130, upon receiving the biometric data from the case 120-$k$, learns characteristics of the behavior data (e.g., by setting the neural network parameters 135) and extracts feature vectors 136 for case 120-$k$, as explained above with reference to FIGS. 5-8. During a second period of the enrollment phase and the authentication phase, the case 120-$k$ obtains the neural network parameters 135 from the server 130, stores as the neural network parameters 222, and uses the neural network parameters 222 to extract feature vectors. Further, the case 120-$k$ generates an authentication score as a function of the plurality of identifiability scores and the plurality of feature vectors outputted from the neural network 220. Additionally, in some embodiments, during the second period of the enrollment phase, the case 120-$k$ compares the feature vectors outputted from the neural network 220 with the feature vectors 136 extracted by the secure server 130. Based on the comparison result, an indication of whether the authentication score is stable over a given threshold is provided to the user.

Figure 10:
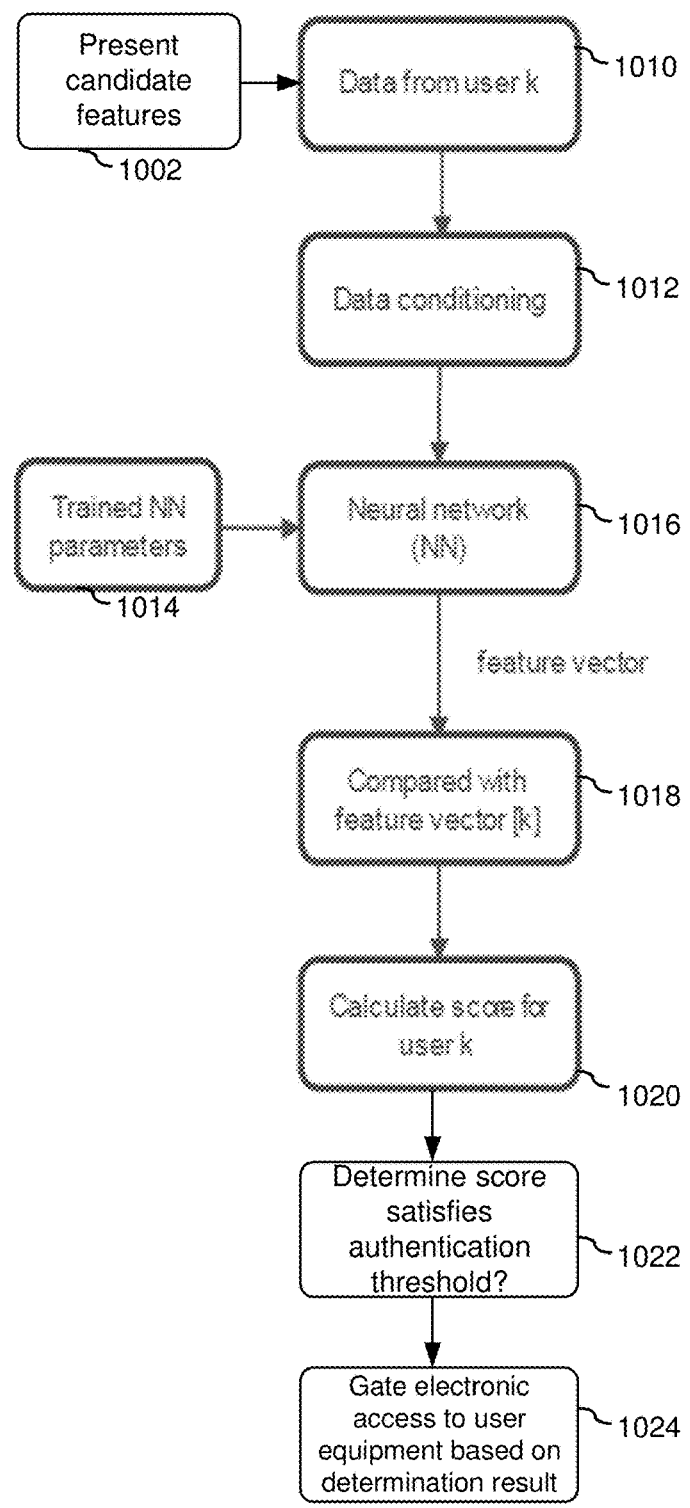
FIG. 10 is a flow diagram illustrating a method of biometric IDA in accordance with some embodiments.

FIG. 10 is a flowchart representation of a method 1000 for biometric identity and authentication, in accordance with some embodiments. In some embodiments, the method 1000 is performed at a first device (e.g., the case 120) arranged to hold a second device (e.g., the user equipment 110). In some embodiments, the method 1000 includes presenting candidate features to the user 111, as represented by block 1002. In some embodiments, the presented candidate features are the most reliable features as determined by the server 130, e.g., the top five features that provide the most unique statistical characterizations of a particular user. In some embodiments, at least one of the first device or the second device is capable of obtaining the candidate features. In such embodiments, the method 1000 further includes obtaining a set of user-selected features from the candidate features, such that obtaining the biometric data of the user 111 from the first device includes obtaining a set of biometric data associated with the set of user-selected features, and extracting from the biometric data includes extracting from a set of biometric data associated with the set of user-selected features.

In some embodiments, as represented by block 1010, the method 1000 includes obtaining biometric data of a user of the second device (e.g., the user 111-*k* of the user equipment 110-*k*). In some embodiments, obtaining the biometric data of the user 111 of the second device includes continuously obtaining a first subset of the biometric data using sensors (e.g., the sensors 125) of the first device, such as IMU, GPS, microphones, heart rate monitors and/or the like on the case 120. In some embodiments, obtaining the biometric data of the user 111 of the second device includes periodically requesting from the second device a second subset of the biometric data obtained using sensors of the second device. For example, IMU, GPS, and/or microphones on the user equipment 110 gather a set of biometric data. Such data can be periodically requested for authentication purposes, in addition to the first subset of the biometric data independently collected by the case 120.

In some embodiments, as represented by block 1012, the method 1000 further includes conditioning the biometric data, including filtering the biometric data to remove outliers and normalizing the biometric data, as explained above with reference to FIGS. 2 and 3. In some embodiments, as represented by block 1014, the method 1000 includes receiving trained neural network parameters 135 from a remote feature extractor (e.g., the neural network 134 on the server 130) and stores the trained neural network parameters 135 as the neural network parameters 222 on the case 120. In some embodiments, as represented by block 1016, the method 1000 includes using an authentication neural network (e.g., the neural network 220) for extracting a plurality of feature vectors from the biometric data using the locally stored neural network parameters 222. In some embodiments, the plurality of feature vectors extracted by the authentication neural network 220 are associated with a plurality of identifiability scores.

In some embodiments, as represented by block 1018 and block 1020, the method 1000 includes generating an authentication score as a function of the plurality of identifiability scores and the plurality of feature vectors extracted by the neural network 220. In some embodiments, the authentication score calculation includes sending the biometric data to a remote feature vector extractor (e.g., the neural network 134 on the server 130) through a secure channel, receiving feature vectors 136 extracted by the remote feature vector extractor through the secure channel, comparing the feature vectors 136 with the plurality of feature vectors extracted by the authentication neural network 220 to derive a difference between the feature vectors 136 and the plurality of feature vectors extracted by the neural network 220 as represented by block 1018, and providing the difference as an input to determine the authentication score.

In some embodiments, during the initial registration, the difference indicates whether the authentication score is stable. For example, if the heart activities vary significantly, the feature vectors extracted during the registration period can be significantly different from the feature vectors received from the remote neural network. An indication signaling the user 111 that such features may not be stable can be provided. In some embodiments, in case the user 111 prefers using the unstable features for authentication, the authentication threshold can be adjusted, e.g., lowered to widen the acceptable range of the authentication score.

Still referring to FIG. 10, in some embodiments, as represented by block 1022, the method 1000 includes determining whether or not the authentication score satisfies an authentication threshold and based on the determination result. In some embodiments, as represented by block 1024, the method 1000 includes gating electronic access to the second device based on whether or not the authentication score satisfies the authentication threshold. In some embodiments, gating the electronic access to the second device includes providing a lock signal to the second device in response to determining that the authentication score does not satisfy the authentication threshold.

For example, the CMFA can be performed after "what you have" authentication factor(s) (e.g., the case ID) and/or "what you know" factor(s) (e.g., password) have successfully authenticated the user 111. In such embodiments, the CMFA provides a locking signal when the authentication score fails to satisfies the authentication threshold. In other words, in case an unauthorized third-party cracks the password or forges the fingerprint to gain entry to the phone, the CMFA can detect the different behavioral pattern based on the third-party's interaction with the phone and lock the phone to stop the third-party from continued use of the user equipment.

In some embodiments, gating the electronic access to the second device includes providing an unlock signal to the second device in response to determining that the authentication score satisfies the authentication threshold. In such embodiments, the CMFA is performed as an unlocking mechanism for the convenience of the user 111. For example, the user 111 can pick up the phone and move around as part of his normal routine to unlock the phone. Relative to conventional authentication methods based on "what you know" factor(s), the CMFA is less burdensome to the user 111, e.g., there is no need to memorize anything in order to gain entry to the phone.

In some embodiments, generating the authentication score as the function of the plurality of identifiability scores and the plurality of feature vectors includes deriving an authentication key from the plurality of feature vectors extracted by the neural network 220 (e.g., taking the most significant bits of the features of the obtained feature vectors to form a bit stream), and generating the authentication score as the function of the plurality of identifiability scores and the authentication key. In other words, the multi-factor authentication disclosed herein can also use a randomized key generated from the feature vectors as one factor for authenticating the user.

In some embodiments, generating the authentication score as the function of the plurality of identifiability scores and the plurality of feature vectors extracted by the neural network 220 includes receiving a password from the user (e.g., a character based password), and generating the authentication score as the function of the plurality of identifiability scores, the plurality of feature vectors, and the character-based password. In other words, the multi-factor authentication disclosed herein can also use the user-supplied character-based password ("what you know") as one factor for authenticating the user.

In some embodiments, generating the authentication score as the function of the plurality of identifiability scores and the plurality of feature vectors includes retrieving an identifier of the first device (e.g., the case ID 242, FIG. 2), and generating the authentication score as the function of the plurality of identifiability scores, the plurality of feature vectors extracted by the neural network 220, and the identifier. In other words, the multi-factor authentication disclosed herein can also use the device identifier ("what you have") as one factor for authenticating the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device with one or more processors and a non-transitory memory storing instructions for execution by the one or more processors:
obtaining biometric data from a plurality of apparatuses, wherein a respective apparatus of the plurality of apparatuses receives a portion of the biometric data from a respective personal communication device held by a respective housing of the respective apparatus, and the respective personal communication device is insertable into and removeable from the respective housing;
extracting a plurality of feature vectors from the biometric data;
determining a plurality of identifiability scores correspondingly associated with the plurality of feature vectors, wherein each of the plurality of identifiability scores provides a quantitative characterization of a relative uniqueness of a corresponding one of the plurality of feature vectors; and
determining run-time authentication neural network parameters based on a function of the plurality of feature vectors, wherein the run-time authentication neural network parameters enable extraction of one or more feature vectors from biometric data of a particular user, and the run-time authentication neural network parameters are associated with the plurality of feature vectors determined to satisfy an error threshold.

2. The method of claim 1, wherein obtaining the biometric data from the plurality of apparatuses includes obtaining the biometric data from sensors at least partially supported by the respective housing of the respective apparatus.

3. The method of claim 1, wherein obtaining the biometric data from the plurality of apparatuses includes obtaining the portion of biometric data from sensors of the respective personal communication device held by the respective apparatus, and the respective apparatus receives a set of biometric data from the respective personal communication device via a communication interface of the respective apparatus and includes the set of biometric data to be transmitted to the device.

4. The method of claim 1 further comprising aggregating at least some of the biometric data from the plurality of apparatuses.

5. The method of claim 1 further comprising conditioning the biometric data including filtering the biometric data to remove outliers and normalizing the biometric data.

6. The method of claim 1, wherein determining the run-time authentication neural network parameters includes an iterative process including:
determining whether or not in a current iteration, the plurality of feature vectors, obtained using a candidate set of neural network parameters, match a training vector set within the error threshold;
updating the candidate set of neural network parameters in response to determining that the current iteration of the plurality of feature vectors does not match the training vector set within the error threshold;
ceasing the iterative process in response to determining that the current iteration of the plurality of feature vectors matches the training vector set within the error threshold; and
selecting the most recently updated candidate set of neural network parameters as the run-time authentication neural network parameters.

7. The method of claim 1, wherein:
extracting the plurality of feature vectors from the biometric data includes:
dividing the plurality of apparatuses into groups; and
extracting a set of training vectors from a set of biometric data obtained from apparatuses in a respective group of the groups, wherein a portion of the set of biometric data is obtained from personal communication devices used by a set of users via the apparatuses; and
determining the plurality of identifiability scores correspondingly associated with the plurality of feature vectors includes determining whether or not an identifiability score associated with a feature vector in the set of training vectors for the respective group indicates the feature vector is unique for identifying a user in the set of users.

8. The method of claim 7 further comprising updating the run-time authentication neural network parameters in response to determining that the identifiability score associated with the feature vector in the set of training vectors for the respective group indicates the feature vector is not unique for identifying the user in the set of users.

9. The method of claim 1, wherein a feature vector of the plurality of feature vectors is synthesized from multiple characteristics of the biometric data.

10. The method of claim 1, wherein the biometric data include time-varying data from a particular apparatus of the plurality of apparatuses.

11. The method of claim 10, wherein the plurality of identifiability scores also characterizes a time variance of a subset of the plurality of feature vectors for the particular apparatus of the plurality of apparatuses below a threshold.

12. The method of claim 1, wherein the biometric data includes at least one of audio data, heart activities data, or user movement data.

13. A non-transitory computer-readable medium having instructions encoded thereon which, when executed by one or more processors of a device, cause the one or more processors to perform operations comprising:
obtaining biometric data from a plurality of apparatuses, wherein a respective apparatus of the plurality of apparatuses includes a respective housing arranged to hold a respective personal communication device insertable into and removeable from the respective housing, and at least a portion of the biometric data is collected by the respective personal communication device and communicated via the respective apparatus;
extracting a plurality of feature vectors from the biometric data;
determining a plurality of identifiability scores correspondingly associated with the plurality of feature vectors, wherein each of the plurality of identifiability scores provides a quantitative characterization of a relative uniqueness of a corresponding one of the plurality of feature vectors; and
determining run-time authentication neural network parameters based on a function of the plurality of feature vectors, wherein the run-time authentication neural network parameters enable extraction of one or more feature vectors from biometric data of a particular user, and the run-time authentication neural network parameters are associated with the plurality of feature vectors determined to satisfy an error threshold.

14. The non-transitory computer-readable medium of claim 13, wherein the operations further comprising aggregating at least some of the biometric data from the plurality of apparatuses.

15. The non-transitory computer-readable medium of claim 13, wherein the operations further comprising conditioning the biometric data including filtering the biometric data to remove outliers and normalizing the biometric data.

16. The non-transitory computer-readable medium of claim 13, wherein determining the run-time authentication neural network parameters includes an iterative process including:
  determining whether or not in a current iteration, the plurality of feature vectors, obtained using a candidate set of neural network parameters, match a training vector set within the error threshold;
  updating the candidate set of neural network parameters in response to determining that the current iteration of the plurality of feature vectors does not match the training vector set within the error threshold;
  ceasing the iterative process in response to determining that the current iteration of the plurality of feature vectors matches the training vector set within the error threshold; and
  selecting the most recently updated candidate set of neural network parameters as the run-time authentication neural network parameters.

17. The non-transitory computer-readable medium of claim 13, wherein:
  extracting the plurality of feature vectors from the biometric data includes:
    dividing the plurality of apparatuses into groups; and
    extracting a set of training vectors from a set of biometric data obtained from apparatuses in a respective group of the groups, wherein a portion of the set of biometric data is obtained from personal communication devices used by a set of users via the apparatuses; and
  determining the plurality of identifiability scores correspondingly associated with the plurality of feature vectors includes determining whether or not an identifiability score associated with a feature vector in the set of training vectors for the respective group indicates the feature vector is unique for identifying a user in the set of users.

18. The non-transitory computer-readable medium of claim 17, wherein the operations further comprising updating the run-time authentication neural network parameters in response to determining that the identifiability score associated with the feature vector in the set of training vectors for the respective group indicates the feature vector is not unique for identifying the user in the set of users.

19. The non-transitory computer-readable medium of claim 13, wherein a feature vector of the plurality of feature vectors is synthesized from multiple characteristics of the biometric data.

20. The non-transitory computer-readable medium of claim 13, wherein the biometric data include time-varying data from a particular apparatus of the plurality of apparatuses; and the plurality of identifiability scores also characterizes a time variance of a subset of the plurality of feature vectors for the particular apparatus of the plurality of apparatuses below a threshold.

* * * * *